United States Patent [19]

Loos

[11] Patent Number: 5,331,850

[45] Date of Patent: Jul. 26, 1994

[54] APPARATUS FOR INDICATING THE LEVEL OF A MATERIAL IN A CONTAINER

[75] Inventor: George J. Loos, North Wales, Pa.

[73] Assignee: Arkwin Industries Incorporated, Westbury, N.Y.

[21] Appl. No.: 27,006

[22] Filed: Mar. 5, 1993

[51] Int. Cl.⁵ .................. G01F 23/02; G01N 21/85
[52] U.S. Cl. ........................ 73/293; 385/12; 250/577; 250/900
[58] Field of Search ............. 73/293; 307/311; 250/577, 900; 385/12

[56] References Cited

U.S. PATENT DOCUMENTS

| | | |
|---|---|---|
| 2,862,782 | 12/1958 | Cann, Sr. . |
| 2,911,828 | 11/1959 | Keating et al. . |
| 3,119,268 | 1/1964 | Stanley . |
| 3,120,125 | 2/1964 | Vasel . |
| 3,242,794 | 3/1966 | Crane . |
| 3,272,174 | 9/1966 | Pribonic . |
| 3,466,928 | 9/1969 | Kind . |
| 3,548,657 | 12/1970 | Panerai et al. . |
| 3,713,338 | 1/1973 | Kind ........................ 73/293 |
| 4,320,394 | 3/1982 | John, Jr. . |
| 4,459,584 | 7/1984 | Clarkson . |
| 4,976,146 | 12/1990 | Senghaas et al. . |

Primary Examiner—Daniel M. Yasich

Attorney, Agent, or Firm—Cohen, Pontani, Lieberman & Pavane

[57] ABSTRACT

An apparatus is provided for indicating a level of a fluid in a reservoir and comprises a first multi-strand fiber optic cable with one end of the strands being disposed for receiving light from a light source for transmission to the second ends. A second multi-strand fiber optic cable having the same number of strands is disposed for receiving light from the second ends of the strands in the first cable. The second ends of the second cable are arranged for indicating the presence of light received by respective ones of the first ends of the second cable. A detector detects the level of the fluid in the reservoir, and an interrupter is disposed between the second ends of the first multi-strand fiber optic cable and the first ends of the second multi-strand fiber optic cable for interrupting the transmission of light between corresponding pairs of strands of the first and second fiber optic cables. A rotating member winds and unwinds the interrupter in accordance with the level of fluid detected by the detector, such that the interrupter interrupts a number of strands of the first and second plurality of multi-strand fiber optic cables depending of the fluid level, whereby the second ends of the fiber optic strands in the second cable indicate the level of fluid in the container.

17 Claims, 5 Drawing Sheets

APPARATUS FOR INDICATING THE LEVEL OF A MATERIAL IN A CONTAINER

FIELD OF THE INVENTION

The present invention is directed to an apparatus for indicating a level of a material in a container. More particularly, the invention is directed to an apparatus having an indicator for indicating a level of a fluid contained in a reservoir with the indicator being disposed remotely from the reservoir.

BACKGROUND OF THE INVENTION

Mechanical devices and, more particularly, aircraft contain various types of fluid systems, as for example, hydraulic systems. These hydraulic systems perform various functions including the control of flight control surfaces of the aircraft. It is critical for these hydraulic systems to contain an adequate supply of hydraulic fluid in their reservoirs so that they may function properly. Otherwise, if there are insufficient fluid levels, such hydraulic fluid systems may partially or completely fail to operate. The failure of such hydraulic fluid systems may render the aircraft uncontrollable with potentially disastrous results. To insure adequate hydraulic fluid levels, on board instrumentation is typically provided to monitor the fluid levels both during flight, by aircraft operating personnel, and on the ground during periodic maintenance by maintenance personnel.

In an aircraft hydraulic fluid system, the reservoir containing the hydraulic fluid may be located in an area that is only accessible by the disassembly of aircraft components in the vicinity thereof. Such disassembly is complex, time consuming, expensive and inefficient for merely determining the fluid level in the reservoir. Therefore, in order to overcome this problem, a remote fluid level indicator is provided comprising a first portion for detecting the fluid level and an indicator portion, which is conveniently located, for displaying the fluid level. In general, a remote fluid level indicator is provided for each hydraulic fluid system, with the indicating portion of each indicator located in the cockpit of the aircraft so that aircraft personnel may remotely monitor the fluid level. While this type of fluid level indicator may be conveniently located for aircraft personnel, such indicators are, however, inconveniently located for maintenance personnel who typically service the aircraft from outside the cockpit, such as underneath the aircraft. Moreover, some fluid level indicators comprise an electrical transducer and rely on an aircraft energy source to measure the fluid level of the reservoir. In such a fluid level indicator, the measured fluid level is converted to an electrical signal for display on a cockpit gauge. This type of fluid level indicator is undesirable for maintenance personnel since during one-the-ground maintenance, the electrical power source is generally deenergized rendering such indicators inoperative.

Furthermore, it will be appreciated that the volume level of the hydraulic fluid varies in accordance with the temperature thereof, i.e., as the fluid temperature increases the volume of the fluid increases and vice versa. Accordingly, to determine the amount of fluid in the reservoir with a higher precision, the fluid indicator should compensate for actual fluid temperature relative to a predetermined reference temperature.

Heretofore, various attempts have been made to provide a remote liquid level indicator. For example, U.S. Pat. No. 3,129,125 to Vasel is directed to a liquid level indicator for measuring the volume of the fluid contained in the reservoir and comprises a plurality of transilluminators having first ends illuminated by a light source and second ends terminating at an indicating panel for indicating the liquid level. Each of the plurality of transilluminators passes into and out of the reservoir. The plural transilluminators are each separated into first and second portions with a respective prism therebetween. Each prism is located at a corresponding elevation in the reservoir, so that as the fluid level increases the number of prisms immersed thereby also increases. In this arrangement, if a prism is not covered by the fluid, the light transmitted from a corresponding first portion of the transilluminator is refracted to the second portion thereof for transmission to the indicating panel, thus illuminating the other end of the transilluminator. Alternatively, if a prism is covered by the fluid, the angle of refraction is changed such that the light is not refracted to the second portion, thus not illuminating the other end of the transilluminator. In this device, as the fluid level increases the number of illuminated receiving ends decreases, and as the fluid level decreases the number of illuminated receiving ends increases. However, this device does not address the problem of variations in the fluid volume due to changes in fluid temperature. Moreover, since the transilluminators pass into and out of the reservoir with the prisms internally located, the reservoir is complicated to construct and maintain.

U.S. Pat. No. 3,119,268 to Stanley is directed to a liquid level indicating gauge for use in a high pressure steam boiler comprising a liquid-containing column having a water column chamber spaced within a confinement wall. The water column has two opposite sides, each side comprising a series of vertically aligned glazed openings for transmitting light therethrough. The column also comprises a series of shutters for each respective pair of openings. The shutters comprise rigid massive bodies of resistant material having a density relative to water (i.e., greater than one). The shutters are pivoted between their ends on levers for movement in a restricted arc on a vertical plane. As the liquid level immerses each shutter, that shutter pivots on its lever to block the passage of light through its respective pair of openings. More specifically, as the volume of liquid in the column increases the number of shutters blocking the number of corresponding pairs of openings also increases, thus blocking the transmission of light through the corresponding pairs of openings. On the other hand, as the volume of liquid in the column decreases, the number of shutters blocking corresponding pairs of openings decreases, thereby allowing the transmission of light through the unblocked pair of openings. Like the Vasel device, the Stanley apparatus does not address the problem of variations in the fluid volume due to changes in fluid temperature. Similarly, since the shutters are arranged in the reservoir, the reservoir is complicated to construct and maintain.

OBJECTS OF THE INVENTION

Accordingly, it is an object of the present invention to provide a fluid level indicator which overcomes the aforementioned problems.

It is a further object of the present invention to provide a fluid level indicator located remotely from a reservoir containing the fluid.

It is an additional object of the present invention to provide a fluid level indicator having an operative assembly disposed external to the reservoir.

It is another object of the present invention to provide a remotely located fluid level indicator that compensates for a volume change of the fluid in the reservoir due to a change in the fluid temperature.

Other objects and features of the present invention will become apparent from the following detailed description considered in conjunction with the accompanying drawings. It is to be understood, however, that the specification and drawings are intended for the purposes of illustrating the preferred embodiments and not as a definition of the limits of the invention, for which reference should be made to the appended claims.

SUMMARY OF THE INVENTION

In the currently preferred embodiment of the present invention, an apparatus for indicating the level of a material in a container having a moveable member indicative of the level of the material is provided with a plurality of electromagnetic wave guides having respective first and second ends. The first ends of the plurality of electromagnetic wave guides are disposed for receiving energy from an electromagnetic wave source. The second ends of the plurality of electromagnetic wave guides are disposed for indicating the presence of energy received by the respective ones of the first ends. An interrupting means is disposed external to the reservoir and between the electromagnetic wave source and the seconds ends of the plurality of electromagnetic wave guides. The interrupting means includes a moving means operatively connected to the moveable member for moving an interrupter in a predetermined direction in accordance with the level of material in the container for interrupting the transmission of energy from the electromagnetic wave source to one or more of the plurality of electromagnetic wave guides dependent on the level of liquid in the container. In this arrangement, the number of second ends of the plurality of electromagnetic wave guides receiving electromagnetic energy from the first ends indicates the level of the material in the container.

In accordance with another aspect of the present invention, the interrupter means further comprises a temperature compensating means for adjusting the movement of the interrupter relative to the plurality of electromagnetic wave guides to compensate for a change in volume of the material due to a change in temperature of the material relative to a predetermined reference temperature.

In accordance with a further aspect of the present invention, an apparatus is provided for indicating the level of material in a container having a moveable member indicative of the level of the material, the apparatus comprising first and second pluralities of electromagnetic wave guides. First ends of the first plurality of electromagnetic wave guides are disposed for receiving energy from an electromagnetic wave source for transmission of the energy to respective second ends of the first plurality of electromagnetic wave guides. First ends of a second plurality of electromagnetic wave guides are disposed for receiving energy from respective second ends of the first plurality of wave guides. Second ends of the second plurality of wave guides are disposed for indicating the presence of energy received by respective ones of the first ends of the second plurality of electromagnetic wave guides. A detecting means is operatively connected to the moveable member for detecting the amount of displacement of the moveable member which is indicative of the level of material in the container. An interrupter is disposed between the second ends of the first plurality of electromagnetic wave guides and the first ends of the second plurality of electromagnetic wave guides for interrupting the transmission of energy between corresponding ones of the first and second plurality of electromagnetic wave guides. A rotating means winds and unwinds the interrupter thereabout in accordance with the level of the material detected by the detecting means so that the interrupter interrupts the transmission of electromagnetic energy between one or more of the first and second plurality of wave guides dependent on the level of material in the container. Accordingly, the number of second ends of the plurality of electromagnetic wave guides receiving electromagnetic energy from the first plurality of electromagnetic wave guides indicates the level of the material in the container.

According to a still further aspect of the present invention, a method is provided for measuring the level of the material in a container having a moveable member indicative of the level of material in the container. The method comprises the step of transmitting energy from an electromagnetic wave source for reception by first ends of a plurality of electromagnetic wave guides for transmission to second ends of the electromagnetic wave guides. The amount of displacement of the movable member is then detected which is indicative of the level of the material in the container, and the reception of electromagnetic energy received by a number of the first ends of the plurality of electromagnetic wave guides is interrupted, external to the reservoir, in accordance with the amount of displacement detected. In this method, the number of second ends of the plurality of electromagnetic wave guides receiving electromagnetic energy indicates the level of the material in the container.

DETAILED DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
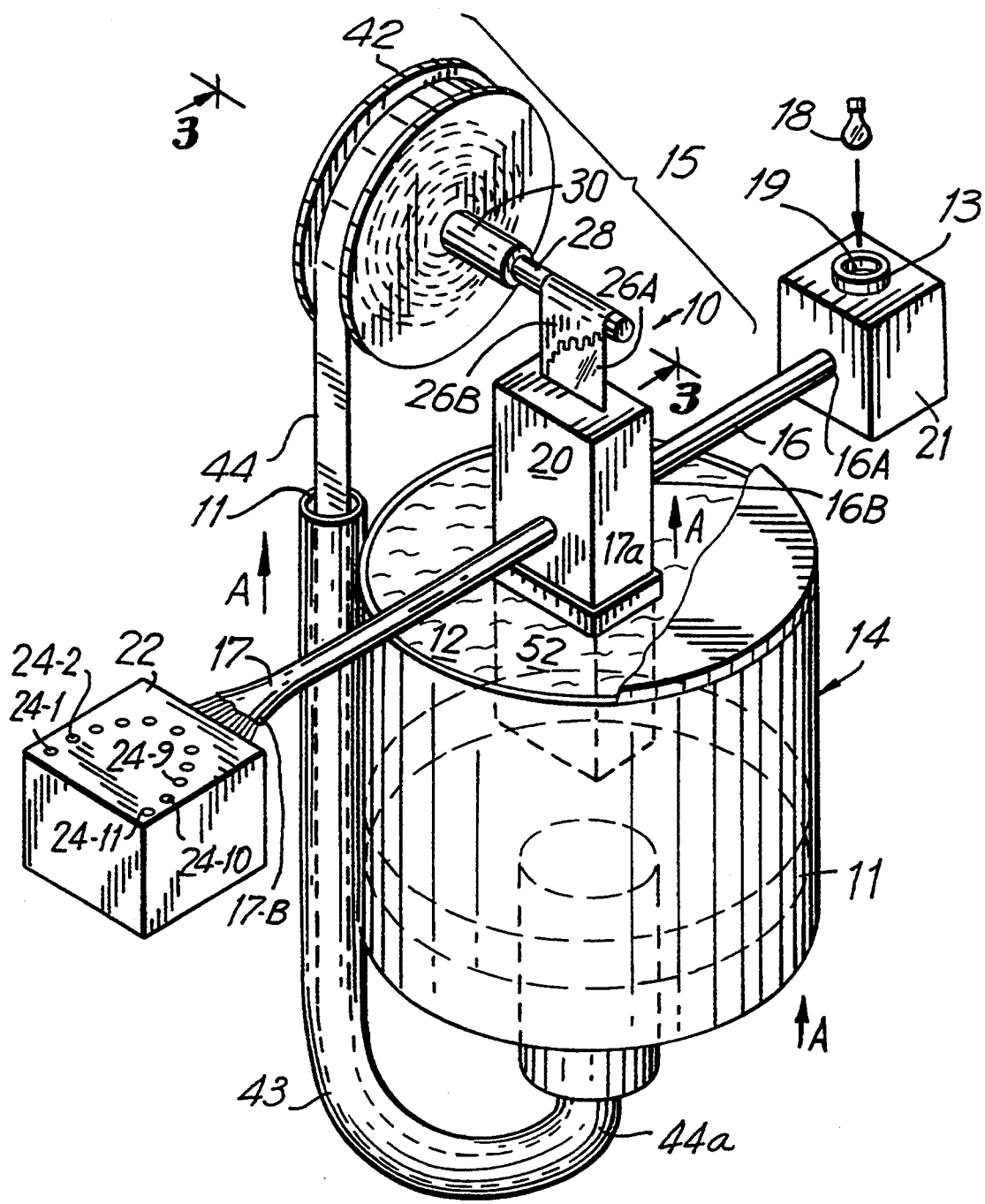
FIG. 1 is a perspective view of a fluid level indicator in accordance with the present invention.

Turning now to the drawings, FIG. 1 depicts a level indicator according to the present invention, generally indicated by reference numeral 10, for indicating the level of a fluid 12 contained in reservoir 14. In the preferred embodiment, the fluid 12 is a hydraulic fluid for use in an aircraft control system (not shown), but as will be appreciated by one of ordinary skill in the art, the fluid level indicator 10 may be utilized to indicate the fluid level of any type of fluid. As used herein, the term aircraft is intended to denote any flying vehicle including, but not limited to, airplanes or helicopters or the like. The inventor also contemplates that the level indicator 10 may be used to indicate the level of gases or particles contained in the reservoir 14.

In the preferred embodiment, the fluid level indicator is intended to be used by maintenance personnel when the aircraft is on the ground for monitoring the level of hydraulic fluid in a hydraulic system (not shown), the latter forming no part of the subject invention. The hydraulic system of the type commonly used in aircraft is a closed system, i.e. the hydraulic fluid system is substantially sealed from the atmosphere. As the components of a conventional hydraulic system are well known to one of ordinary skill in the art, only those pertinent to the present invention will be discussed herein.

Referring to FIG. 1, the conventional hydraulic system includes the reservoir 14 and a piston 11 or movable member. When a volume of fluid leaves or enters the reservoir, by appropriate conventional means, such as, for example, an outlet and an inlet tube (not shown), the piston 11 maintains the fluid at a constant pressure in the reservoir 14, typically in the range of 60 to 80 psi. To maintain this constant pressure, the piston 11 is displaced in the direction opposite to arrow A when the amount of hydraulic fluid in reservoir 14 increases, and is displaced in the direction of arrow A when the hydraulic fluid in reservoir 14 decreases. Thus, as is apparent, the position of piston 11 is itself indicative of the level of the fluid 12 in the reservoir 14 though, of course, no visual or other readout from the piston is available to apprise ground personnel of the hydraulic fluid level.

In the preferred embodiment, the fluid level indicator of the invention is operatively engageable with the piston 11 and is arranged externally to the reservoir 14. In essence, the fluid level indicator 10 of the invention provides a remote visual or other read-out of the level of the fluid 12 in the reservoir 14 in accordance with the displacement of piston 11.

The general operation of the preferred fluid level indicator 10 is as follows. The fluid level indicator 10 comprises a plurality of electromagnetic wave guides, for example, two fiber optic cables 16 and 17, each comprising a plurality of fiber optic strands each having a first end and a second end. A light source 18 is provided for illuminating a first end 16A of the first multi-strand fiber optic cable 16. The second other end 16B of the fiber optic cable 16 and a first end 17A of the second fiber optic cable 17 are separated by an interrupter assembly, generally designated as 15, which is operatively connected to the piston 11 for movement therewith. The fiber optic cables 16, 17 are secured in an interrupter adapter 20 of assembly 15 such that each fiber optic strand at the end 16B of cable 16 is aligned with a corresponding fiber optic strand of the end 17A of the cable 17. As will be explained in detail hereinbelow, the interrupter assembly 15 interrupts the transmission of light from one or more fiber optic strands of the first cable 16 to the corresponding aligned strands of the second cable 17 dependent on the level of the fluid 12 in the reservoir 14. The free ends of the fiber optic strands at the end 17B of the cable 17 are arranged in a display panel 22, with the number of illuminated strands in the display indicating the level of fluid 12 in the reservoir 14.

The light source 18 illuminates the first end 16A of multi-strand fiber optic cable 16 through a window 19 in an illuminating assembly 21 mounted, for example, to a structural component of the aircraft, which may be remote from reservoir 14 but accessible to ground personnel. In the preferred embodiment, the light source 18 is a conventional flashlight of a type carried by aircraft maintenance personnel. In practice, the flashlight is placed adjacent to the window 19 for illuminating the fiber optic cable 16, the flashlight being maintained in position by a collar 13 such that the ground personnel do not have to hold the flashlight in place, thereby freeing their hands for other uses. Alternatively, the light source 18 may comprise a built-in light source in fixed relation to the window 19, such as an incandescent light, light emitting diodes, etc., which light source can be activated upon demand, as by a switch.

Figure 2A:
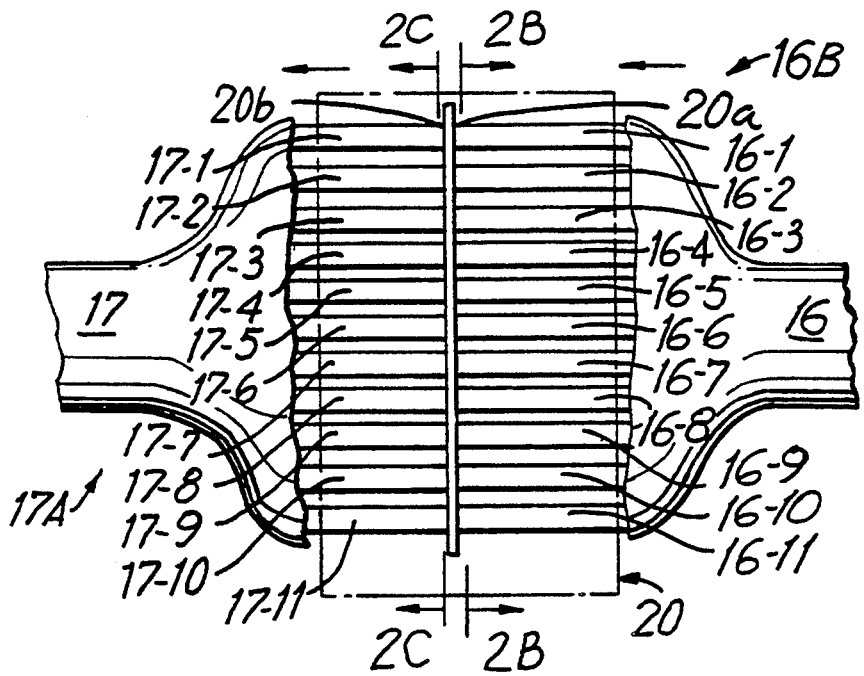
FIGS. 2A-2C are schematic diagrams of the interrupter adaptor and the fiber optic strands.

The second end 16B of the fiber optic cable 16 is connected to the interrupter adaptor 20 of interrupter assembly 15 for transmitting the light received from light source 18 to a first end 17A of the second multi-strand fiber optic cable 17. As best seen in FIG. 2A, the first and second fiber optic cables 16, 17 each comprise eleven fiber optic strands, 16-1 to 16-11 and 17-1 to 17-11, respectively, with fiber optic strands 16-1 to 16-11 being arranged in spaced confronting relation with fiber optic strands 17-1 to 17-11. As such, fiber optic strands 16-1 to 16-11 and 17-1 to 17-11 collectively define eleven fiber optic strand pairs. The second end 17B of the fiber optic cable 17 terminates at a display panel 22 for indicating the fluid level in reservoir 14 as explained below.

Figure 2B:
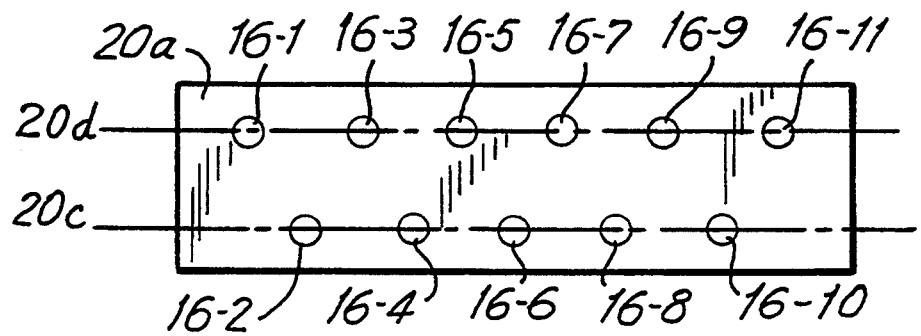
Figure 2C:
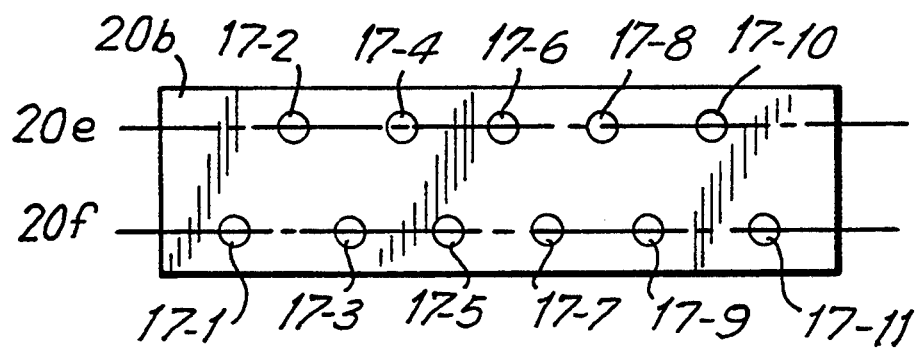

Referring now FIGS. 2A–2C, the fiber optic strands 16-1 to 16-11 and 17-1 to 17-11 are secured, as by epoxy, in cavities of opposing walls 20a and 20b, respectively, of interrupter adaptor 20. As shown, the fiber optic strands 16-1 to 16-11 in cable 16 are arranged in spaced relation in two horizontal rows 20c, 20d. Similarly, the fiber optic strands 17-1 to 17-11 are arranged in spaced relation in two horizontal rows 20e, 20f in wall 20b. As should now be apparent, horizontal rows 20c and 20e are coplanar, whereby row 20c confronts row 20e. Likewise rows 20d and 20f are coplanar, whereby row 20d confronts row 20f. By virtue of this arrangement, light transmitted from the light source 18 illuminates fiber optic strands 16-1 to 16-11 which, when uninterrupted, illuminate fiber optic strands 17-1 to 17-11, respectively. Of course, the spacing of fiber optic strands 16-1 to 16-11 and 17-1 to 17-11 is such that each fiber optic strand 16-1 to 16-11 is capable of illuminating only the confronting strand of fiber optic cable 17, i.e. strand 16-1 illuminates only strand 17-1, and so on. It should by now be appreciated that the fiber optic strands of cables 16 and 17 are arranged in two horizontal rows for purposes of compactness. Of course, if the size of the interrupter adaptor 20 is not a factor, the strands could be arranged in a single row.

As noted above and shown in FIG. 1, the second end 17B of fiber optic cable 17 terminates at the display panel 22, each strand 17-1 to 17-11 being secured to the display panel 22 by any conventional means, such as being epoxied thereto. As preferred and shown, each strand 17-1 to 17-11 is terminated with a lens caps 24-1 to 24-11, respectively, to provide a wider viewing angle for the light emitted from the strands 17-1 to 17-11 at the panel 22. As is well known, the lens caps may be formed of glass, plastic or the like. Like the assembly 21, it is contemplated that the panel 22 will be mounted on a structural component of the aircraft, which may be remote from reservoir 14 but accessible to ground personnel.

The interrupter assembly 15 also comprises an interrupter 26 (FIG. 1) having one end disposed in interrupter adaptor 20 between the confronting ends of the cables 16, 17. As best shown in FIG. 2A, the top of the interrupter adaptor 20 includes a slot 25 for receiving the interrupter 26. The interrupter 26 may comprise a film-like material, such as a nylon coated fiberglass tape or the like, and has a substantially opaque portion 26B for blocking the transmission of light between cables 16, 17 and a substantially transparent portion 26A for transmitting light. As used herein, the term substantially transparent is intended to denote the ability of a material to pass light therethrough and should be understood to include variously transparent and translucent surfaces and materials. As shown, the boundary between opaque portion 26B and transparent portion 26A is stepped and formed, by way of example, by silk screening an opaque material on a clear film. As will now be apparent, the substantially transparent portion 26A allows transmission of light between aligned strand pairs of cables 16, 17, whereas the opaque portion 26B blocks the transmission of light therebetween, the number of strand pairs in light transmitting communication indicating the fluid level in the reservoir 14.

In the preferred embodiment, the first fiber optic strand pair 16-1, 17-1 always remain uninterrupted. In other words, when the cable 16 is illuminated, fiber optic strand 17-1 will be illuminated. In this way, the integrity of the fluid level indicator 10 and cables 16 and 17 can be ascertained by ground personnel. That is, if cable 16 or 17 separates from the adaptor 20, for whatever reason, fiber optic strand 17-1 then would not be illuminated, and ground personnel could take appropriate action to repair the cable or fluid level indicator.

As presently preferred, the fiber optic strands 16-1 to 16-11 and 17-1 to 17-11 are arranged in the interrupter adaptor 20 with approximately the same distance separating adjacent strand pairs such that illumination of each strand pair represents approximately one-eleventh of the reservoir capacity as shown in Table A below:

TABLE A

| Illuminated Fiber Optic Strands | Percent of Reservoir Capacity |
| --- | --- |
| 17-1 | 0–9% |
| 17-1 and 17-2 | 9–18% |
| 17-1 to 17-3 | 18–27% |
| 17-1 to 17-4 | 27–36% |
| 17-1 to 17-5 | 36–45% |
| 17-1 to 17-6 | 45–55% |
| 17-1 to 17-7 | 55–64% |
| 17-1 to 17-8 | 64–73% |
| 17-1 to 17-9 | 73–82% |
| 17-1 to 17-10 | 82–91% |
| 17-1 to 17-11 | 91–100% |

Figure 3:
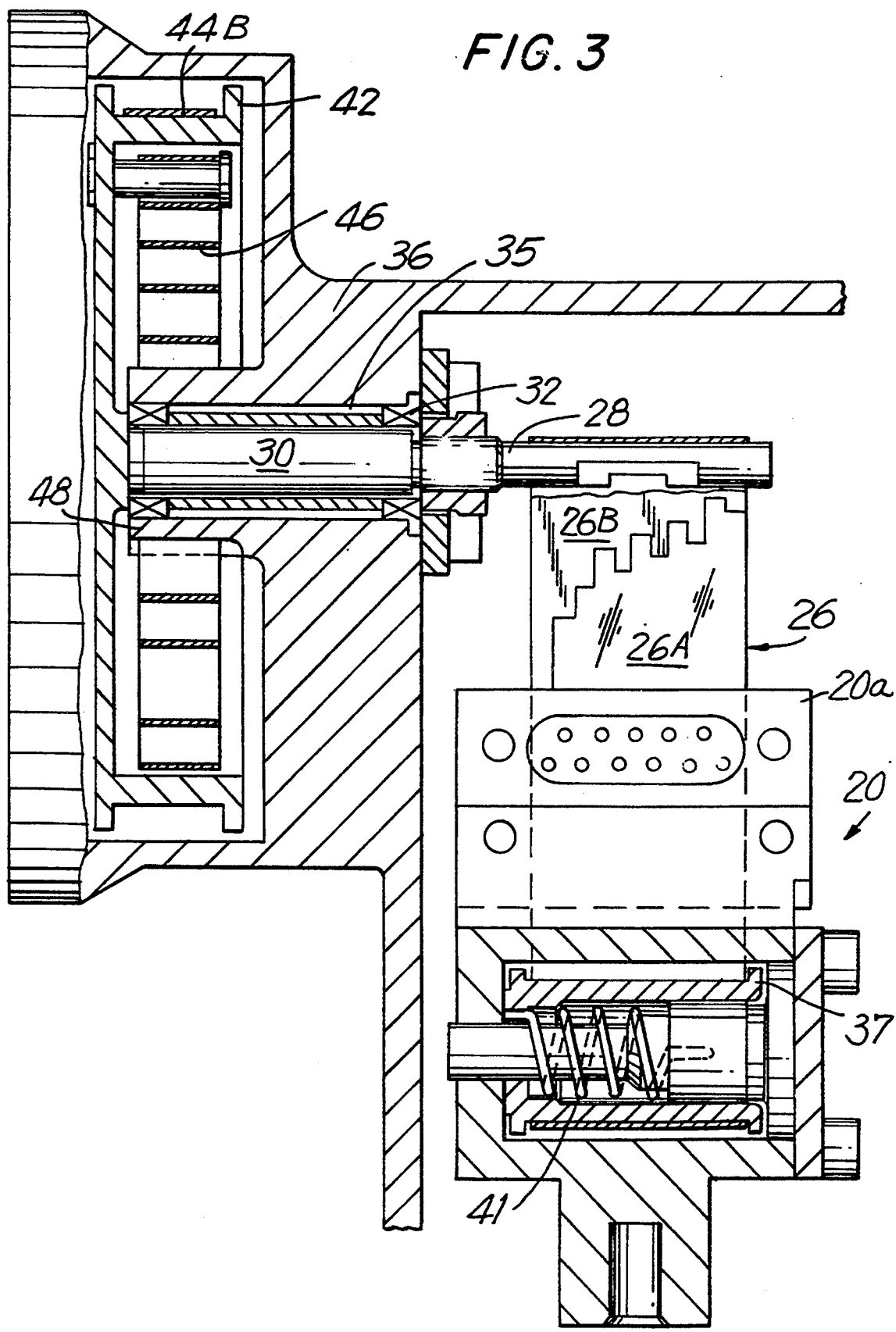
FIG. 3 is a schematic diagram of the rotating assembly.

Referring to FIGS. 1 and 3, the construction and operation of the interrupter assembly 15 will now be explained. The interrupter assembly 15, which is operatively connected to piston 11, is preferably disposed in a housing 36 mounted on the reservoir 14 by any conventional means, such as, threaded bolts (not shown). The interrupter assembly 15 comprises a rotatable section 10 member 47 formed, for example, by machining a single piece of aluminum comprising a drum 42, a coaxial shaft 30 and a coaxial rod 28. The interrupter assembly 15 is operatively connected to the piston 11 by a moving means, for example, a first end 44A of a cable 44 formed, for example, of fiberglass. The cable 44 is guided to the piston 11 at the periphery of the reservoir 14 by a guide means 43. Guide means 43 may comprise a transparent or opaque plastic tube or the like. The other end 44B of the cable 44 is connected to the drum 42 for winding cable 44 thereabout as explained below.

As shown in FIG. 3, one end of a tensioning means, for example a spring 46, is connected to the drum 42 by a bolt 51 and the other end of the spring 46 is connected to a wall 48 of the housing 36 with a bolt (not shown). As should now be apparent, the spring 46 serves to urge drum 42 in a clockwise direction (in FIG. 1) for maintaining the cable 44 in tension. The amount of force available to move the piston 11 in the direction opposite to arrow A is in the range of approximately 6000 pounds. However, the cable 44 acting under the urging of spring 46 can only produce a force on piston 11 which is a fraction of that. Thus, the tension on cable 44 applied by spring 46 does not effect movement of the piston 11. Still referring to FIG. 3 and as is conventional, a bushing 34 is disposed between the shaft 30 and drum housing 36, and the ends of shaft 30 seat is bearings 32 comprised of, for example, Teflon TM. In this arrangement the shaft 30 rotates freely within the cylindrical bore 35.

As will now be apparent, as the fluid level in the reservoir 14 increases, the piston 11 is displaced in the direction opposite to arrow A (FIG. 1). This causes the end of cable 44 secured to piston 11 to move upward, with the slack in cable 44 being taken up as cable 44 winds about the drum 42 under the urging of spring 46. Similarly, as the fluid level decreases, the piston 11 is displaced in the direction of arrow A, pulling cable 44 down with it, thereby unwinding cable 44 from drum 42.

As shown in FIG. 3, one end of the interrupter 26 is attached to and wound about rod 28 which, as noted above, is integral with the shaft 30. The other end of interrupter 26 is attached to and wound about a take-up reel 37 journaled in the bottom of the interrupter adaptor 20 below the cables 16, 17. A resilient tensioning means 41, e.g. a spring, is connected between the take-up reel 37 and the housing portion interrupter adaptor 20 for maintaining the interrupter 26 in tension, much in the manner that drum 42 maintains cable 42 in tension under the urging of spring 46. As will be apparent, when the interrupter 26 is unwound from rod 28, the slack is taken up by the take-up reel 37, and vice versa.

As the level of the fluid 12 in the reservoir 14 increases, the piston 11 is displaced in the direction opposite to arrow A, the cable 44 is wound about drum 42 and the shaft 30 rotates to wind interrupter 26 around rod 28, i.e. interrupter 26 also moves in the direction of arrow A. As the interrupter 26 winds about the rod 28, opaque portion 26B moves upward whereby fewer fiber optic strand pairs are interrupted. As a result, an increased number of the fiber optic strands 17-1 to 17-11 are illuminated and the second end 17B of fiber optic cable 17 indicates an increase in fluid level. For example, when the fluid 12 in the reservoir is at 100% capacity, the piston 11 is maximally displaced in the direction opposite to arrow A and the cable 44 is wound about drum 42 to its maximum position. Shaft 30 and rod 28 rotate with drum 42 thereby winding interrupter 26 about rod 28 to its maximum position. When the interrupter 26 is wound to its maximum position, only the transparent portion 26A is positioned between the fiber optic strand pairs in the interrupter adaptor 20. In this situation, light from each of the fiber optic strands 16-1 to 16-11 is transmitted to fiber optic strands 17-1 to 17-11, respectively. Therefore, all of the fiber optic strands 17-1 to 17-11 are illuminated at the display panel 22, indicating that the reservoir 14 is approximately 100% capacity.

As the level of the fluid 12 in reservoir 14 decreases, the piston 11 is displaced in the direction of arrow A which in turn causes cable 44 to unwind from drum 42. The unwinding of cable 44 from drum 42 rotates the shaft 30 and rod 28 for unwinding the interrupter 26 from the rod 28, the slack being taken up as the interrupter 26 winds about take-up reel 37 under the urging of spring 41. The more the interrupter 26 unwinds from shaft 28, the greater the number of fiber optic strand pairs interrupted by opaque portion 26B. As the number of fiber optic strand pairs which are interrupted increases, fewer fiber optic strands 17-1 to 17-11 are illuminated at display panel 22, thus indicating a decrease in the fluid level. For example, when the level of fluid 12 in reservoir 14 is between 0%–9%, the piston 11 is displaced to its maximum displacement in the direction of arrow A, which causes cable 44 to unwind to its maximum unwound position from drum 42, which in turn rotates shaft 30 to unwind the interrupter 26 from the rod 28 to its maximum unwound position. At this fluid level, only the opaque portion 26B of interrupter 26 is disposed between the fiber optic strand pairs 17-2 to 17-11 in the interrupter adaptor 20 and the transmission of light from fiber optic cable 16 to fiber optic cable 17 for these strand pairs is blocked, whereby only fiber optic strand 17-1 remains illuminated, as explained above, and none of the second ends of fiber optic strands 17-2 to 17-11 is illuminated, indicating that the reservoir 14 is between 0%–9% capacity.

Figure 1A:
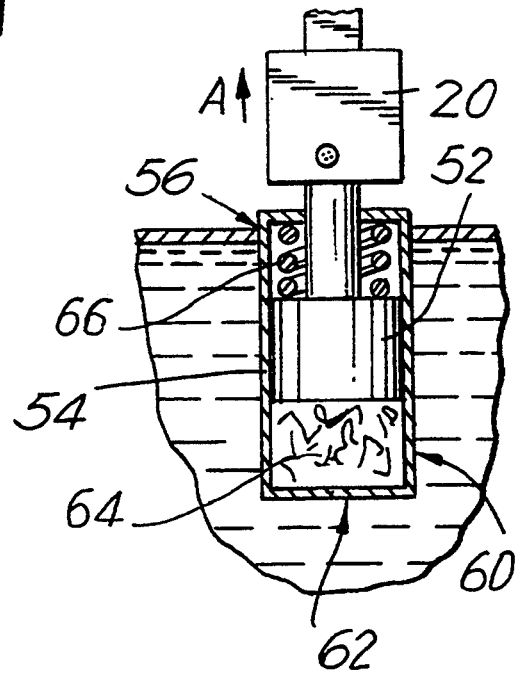
FIG. 1A is a detailed view of the temperature compensation means.

As presently preferred and shown in FIGS. 1 and 1A, the interrupter adaptor 20 is disposed on and fixedly secured to a temperature compensation means 52 by, for example, a set screw (not shown). The temperature compensation means 52 compensates for changes in the volume of the fluid 12 in the reservoir 14 due solely to a change in fluid temperature relative to a predetermined reference temperature, for example 65° F. to 80° F. As explained more fully below, this is accomplished by adjusting the relative position of the interrupter adaptor 20 with respect to the interrupter 26.

The preferred temperature compensation means 52 comprises a piston 54 disposed in cylinder 56 defined by cylindrical side wall 60, a top wall 72 and bottom wall 62. A spring is provided below the bottom of adaptor 20 i.e., between the top wall 72 and piston 54, to exert a downward force. The bottom of the cylinder 56 is filled with a material 64 such as silicone, having a preselected thermal expansion coefficient for displacing piston 54 in proportion to a displacement of piston 11 as caused by thermal expansion or contraction of the hydraulic fluid 12. As shown in FIG. 1A, cylinder 56 is disposed in the reservoir 14 and is surrounded by the fluid 12, such that the temperature of the silicone is maintained substantially at the temperature of the fluid 12. As shown in FIG. 1, the temperature compensation means 52 may also be configured as, for example, rectangular in shape.

As the temperature of the fluid 12 increases, the temperature of the silicone 64 also increases. The increase in temperature of the silicone 64 causes the silicone to expand, thus moving the piston 54 and interrupter adaptor 20 secured thereto upward in the direction of arrow A, the resulting slack in interrupter 26 being taken up by take-up reel 37 under the urging of spring 41. Similarly, as the fluid temperature decreases, the temperature of the silicone 64 likewise decreases, the silicone contracts, and piston 54 and interrupter adaptor 20 move downward in the opposite direction, the lowering of interrupter adaptor 20 causing interrupter 26 to be unwound from take-up reel 37. It will be apparent that for this arrangement to function properly, the downward force exerted by spring 66 on piston 54 must be sufficient to overcome the force of spring 41 about take-up reel 37.

As will be appreciated, the displacing of the interrupter adaptor 20 in the upward direction has the same effect as lowering the interrupter 26. In other words, as the fluid temperature increases, the level indicator 10 would, absent temperature compensation, indicate more fluid mass than is actually contained in the reservoir 14 at the predetermined reference temperature. Accordingly, the temperature compensation means 52 displaces the interrupter adaptor 20 so that the level of the fluid as displayed on display 22 is adjusted downward from what it would otherwise show at the elevated temperature thereby compensating for fluid expansion resulting from an increase in temperature relative to a reference value.

Similarly, as the temperature of the fluid 12 decreases, the piston 54 and the interrupter adaptor 20 are displaced downward, which has the same effect as raising the interrupter 26. That is, as the fluid temperature decreases, the level indicator 10 would, absent any temperature compensation, indicate less fluid mass than would be measured at the predetermined reference temperature. Thus, the temperature compensation means 52 displaces the interrupter adaptor 20 so that the fluid level is displayed somewhat higher to compensate for the fluid mass attributed to this temperature differential.

For example, the hydraulic system of an aircraft that has just been in flight is generally at a temperature higher than the reference temperature, typically 65° F. to 80° F. If the fluid level of that hydraulic system is measured on the ground shortly after flight, the volume of the hydraulic fluid will be expanded relative to the fluid level at the reference temperature. However, in accordance with the present invention, the silicone 64 is at substantially the same raised temperature as the hydraulic fluid, whereupon the silicone 64 expands, and piston 54 and interrupter adaptor 20 move upward. The raising of interrupter adaptor 20 causes interrupter 26 to be wound about take-up reel 37. Thus the temperature compensation means 52 adjusts for fluid expansion resulting from an increase in temperature relative to the reference value.

Figure 4:
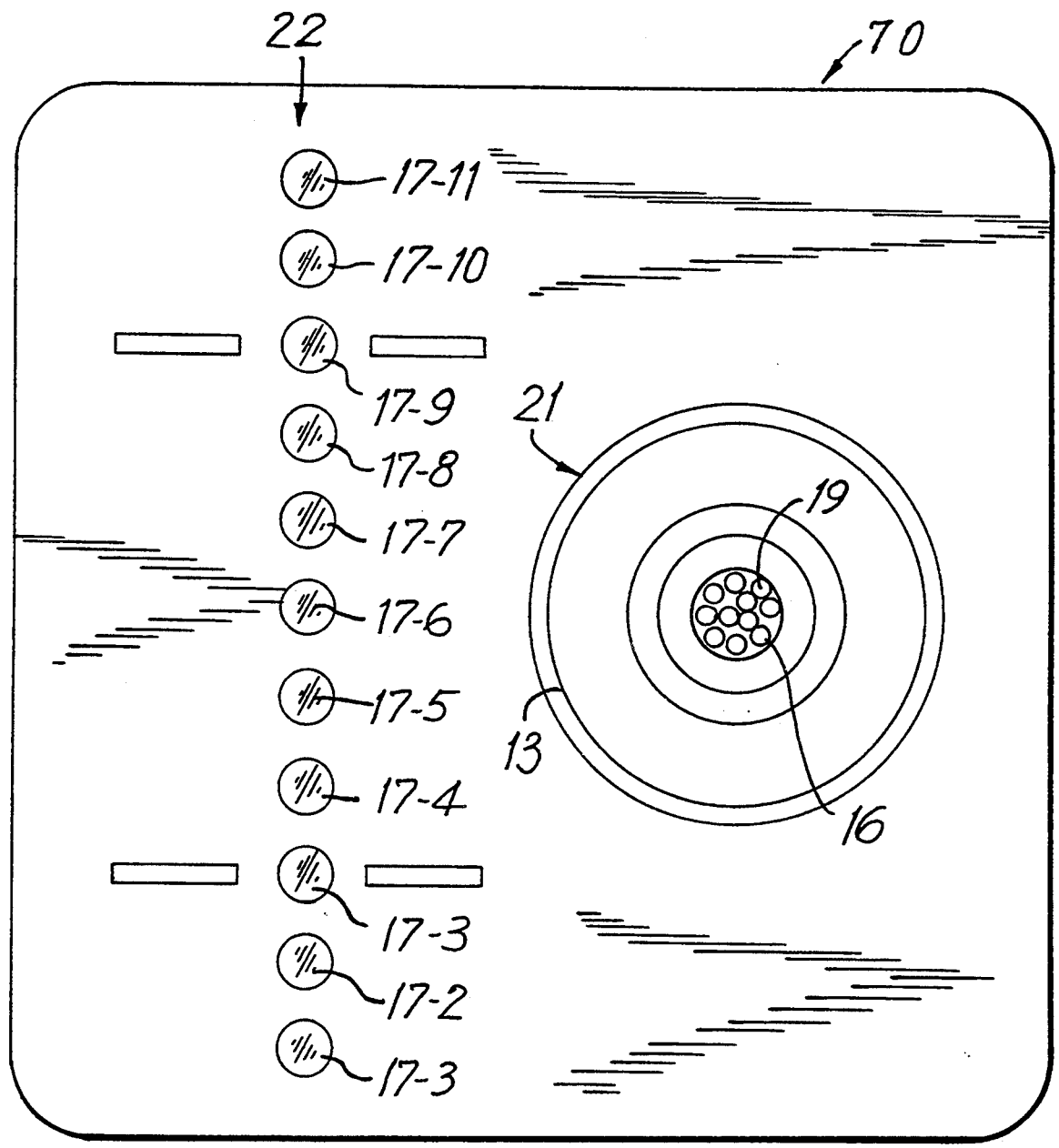
FIG. 4 illustrates a combination unit comprising an illuminating portion for illuminating the fiber optic cable and a display portion for indicating the fluid level.

FIG. 4 illustrates another embodiment of the present invention in which the illuminating assembly and the display panel are combined in a single housing 70, rather than two separate housings as shown in FIG. 1. In this regard, and as will be appreciated by one of ordinary skill in the art, fiber optic cables are relatively flexible so that fiber optic cables 16, 17 may be routed to the housing 70 by simply bending them as necessary. As shown, the housing 70 comprises the window 19 which is connected to the end 16A of the fiber optic cable 16 by, for example, being epoxied thereto. The light source 18 (FIG. 1), or more specifically the flashlight, is positioned opposing the light window 19 in the area defined by collar 13 to illuminate one end of the fiber optic cable 16. The other end of the cable 16 illuminates the uninterrupted strands of fiber optic cable 17 in the interrupter adapter 20 as previously explained. As is the embodiment of FIGS. 1-3, the other ends of the fiber optic strands 17-1 to 17-11 are arranged as a display in one wall of the housing 70, the illuminated ends of fiber optic strands 17-1 to 17-11 indicating the level fluid 12 in the reservoir 14 as set forth in Table 1.

While the operation and arrangement of the fluid level indicator shown and described above is a preferred embodiment, it will be apparent once this description is known that various changes and modifications may be made therein.

For example, the cable 16 may be eliminated and the light source 18 disposed in proximity to interrupter adaptor 20 for illuminating the uninterrupted strands of fiber optic cable 17. Also, and as will be apparent to those who have read this description, the resolution of the level indicator is a function of the number of strand pairs. In other words, by increasing the number of strands in the fiber optic cables 16 and 17, the resolution may be increased. For example, the multi-strand fiber optic cables 16, 17 may each comprise 22 fiber optic strands instead of 11. In this embodiment, the resolution is twice that of the preferred embodiment. Of course, the number of "steps" separating opaque 26B and transparent 26A portions of film 26 must likewise be increased.

In another modification, the fiber optic strands 16-1 to 16-11 and 17-1 to 17-11 may be arranged in a non-linear fashion, i.e., with different distances separating adjacent fiber optic strand pairs. for example, at a predetermined refill level the fiber optic strands may be arranged closer together in the interrupter adaptor 20 than at the other levels in order to provide a higher resolution at the predetermined refill level. Of course, here too the "steps" in film 26 must be adjusted accordingly.

While the preferred embodiment utilizes light and fiber optic cables, it is also contemplated that the level indicator 10 may, alternatively, use other forms of electromagnetic energy such as, by way of example, microwaves, in which event microwave wave guides could be employed instead of fiber optic cables. As used herein, the term wave guide is intended to denote any device which can transmit electromagnetic energy including, but not limited to, fiber optic cables or microwave guides or the like.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An apparatus for indicating a level of a material in a container having a moveable member for moving in a predetermined direction in relation to the level of the material in the container, said apparatus comprising:
a plurality of electromagnetic wave guides having respective first and second ends, wherein said first ends of said plurality of electromagnetic waves guides are disposed for receiving energy from an electromagnetic wave source and said second ends of said plurality of electromagnetic wave guides are disposed for indicating the presence of energy received by respective ones of said first ends; and
interrupting means disposed between the electromagnetic wave source and said first ends, said interrupting means comprising:
an interrupter,
moving means operatively engageable with the moveable member for moving said interrupter in a predetermined direction in relation to the level of the material in the container for interrupting the transmission of energy from the electromagnetic wave source to a number of said plurality of electromagnetic waves guides dependent on the level of material in said container, and
temperature compensating means for adjusting the displacement of said interrupter with respect to said plurality of electromagnetic wave guides to compensate for a change in volume of the material in the container due to a change in temperature of said material relative to a predetermined reference temperature, whereby the number of second ends of said plurality of electromagnetic wave guides receiving electromagnetic energy indicates the level of material in the container.

2. An apparatus for indicating a level of a material in a container having a moveable member indicative of the level of the material therein, said apparatus comprising:
a plurality of electromagnetic wave guides, said plurality of wave guides comprising a multi-strand fiber optic cable having a predetermined number of fiber optic strands, said wave guides having respective first and second ends, wherein said first ends of said plurality of electromagnetic wave guides are disposed for receiving energy from an electromagnetic wave source and said second ends of said plurality of electromagnetic wave guides are disposed for indicating the presence of energy received by respective ones of said first ends; and
interrupting means disposed external to the container and operably disposed between the electromagnetic wave source and said first ends, said interrupting means comprising an interrupter disposed external to the container, said interrupter having moving means, said moving means operatively engageable with the moveable member for moving said interrupter in a predetermined direction in relation to the level of the material in the container and for interrupting the transmission of energy from the electromagnetic wave source to one or more of said plurality of electromagnetic waves guides dependent on said level of material in said container, said electromagnetic wave source comprising a light source in accordance with the amount of movement by said moving means whereby the number of said second ends of said electromagnetic wave guides uninterrupted by said interrupter indicates the level of the material in the container.

3. An apparatus according to claim 2, wherein said interrupter comprises a film having a substantially opaque portion for interrupting the light from the light source to a number of said fiber optic strands and a substantially transparent portion for transmitting the light from the light source to a remaining number of said fiber optic strands in accordance with the level of the material in the container.

4. An apparatus according to claim 3, wherein the moveable member moves in a predetermined direction in relation to the level of the material in the container, wherein said interrupting means further comprises detecting means operably engageable with the moveable member for detecting the amount of movement of the moveable member which is indicative of the level of material in the container, wherein said detecting means is displaced in the predetermined direction of the movement of said moveable member, wherein said moving means comprises rotating means operatively connected to said detecting means and said film for winding and unwinding said film in relation to the amount of displacement of said detecting means such that said film interrupts the light from the light source to a number of said fiber optic strands in accordance with the movement of the moveable member indicative of the level of the material in the container detected by said detecting means.

5. An apparatus according to claim 4, wherein the moveable member comprises a piston disposed in the container for maintaining a constant pressure in said container and wherein said detecting means is operatively connected to said piston.

6. An apparatus according to claim 5, wherein said interrupter means further comprises an interrupter adaptor, wherein said multi-strand fiber optic cable is fixedly secured to said interrupter adaptor, and wherein said interrupter adaptor receives said film.

7. An apparatus according to claim 6, further comprising a temperature compensating means fixedly secured to said interrupter adaptor for adjusting the relative displacement of said interrupter adaptor and hence said film to compensate for a change in volume of the material in the container due to a change in temperature of said material relative to a predetermined reference temperature.

8. An apparatus according to claim 7, wherein a boundary is defined between said opaque portion and said substantially transparent portion of said film and wherein said boundary comprises a step-wise shaped boundary.

9. An apparatus according to claim 8, wherein said detecting means comprises a cable, wherein said cable is operatively connected to said rotating means and said piston, wherein said cable is wound and unwound about said rotating means in relation to the amount of displacement of said detecting means, wherein said rotating means comprises a first resilient tensioning means for maintaining said cable in tension, wherein said interrupter adapter comprises second resilient tensioning means and a take-up reel operatively connected to said film and said second resilient tensioning means for winding said film about said take-up reel when said film is unwound from said rotating means and for unwinding said film from said take-up reel when said film is wound about said rotating means.

10. An apparatus for indicating a level of a material in a container having a moveable member indicative of the level of the material therein, said apparatus comprising:
- a first plurality of fiber optic strands having respective first and second ends, wherein said first ends of said first plurality of fiber optic strands are disposed for receiving light from a light source for transmission of the light to said respective second ends of said first plurality of fiber optic strands;
- a second plurality of fiber optic strands having first and second ends, wherein said first ends of said second plurality of fiber optic strands are disposed for receiving light from respective ones of said second ends of said first plurality of fiber optic strands and said second ends of said second plurality of fiber optic strands are disposed for indicating the presence of light received by respective ones of said first ends of said second plurality of fiber optic strands;
- detecting means operatively connected to the moveable member for detecting the amount of movement of the moveable member which is indicative of the level of the material in the container;
- an interrupter disposed between said second ends of said first plurality of fiber optic strands and said first ends of said second plurality of fiber optic strands for interrupting the transmission of light between one or more of said first and second plurality of fiber optic strands dependent on the level of material in said container; and
- rotating means operatively connected to said detecting means and said interrupter for winding and unwinding said interrupter thereabout in relation to the amount of movement of the movable member which is indicative of the level of the material detected by said detecting means such that the number of said first and second plurality of fiber optic strands interrupted by said interrupter is indicative of the level of material in said container, whereby the number of illuminated or non-illuminated second ends of said second plurality of fiber indicates the level of the material in the container.

11. An apparatus according to claim 10, wherein the moveable comprises a piston disposed in the container and wherein said detecting means is operatively connected to said piston.

12. An apparatus according to claim 10, wherein said interrupter comprises a film having a substantially opaque portion for interrupting the light from said first plurality of fiber optic strands to a number of said second plurality of fiber optic strands and a substantially transparent portion for transmitting the light from the first plurality of fiber optic strands to a remaining number of said second plurality fiber optic strands in accordance with the amount of movement of said movable member.

13. An apparatus according to claim 12, wherein the moveable member moves in a predetermined direction in relation to the level of the material in the container, wherein said detecting means is in operable engagement with the moveable member and is displaced in the predetermined direction as the moveable member, and wherein said rotating means is operatively connected to said detecting means and said film for winding and unwinding said film in relation to the amount of displacement of said detecting means so that said film interrupts the light from said first plurality of fiber optic strands to a number of said second plurality of fiber optic strands in accordance with the level of the material in the container.

14. An apparatus according to claim 13, wherein said interrupter further comprises an interrupter adaptor, wherein said first and second multi-strand fiber optic cables are fixedly secured to said interrupter adaptor, and wherein said interrupter adaptor is arranged to accommodate said film.

15. An apparatus according to claim 14, further comprising a temperature compensating means fixedly secured to said interrupter adaptor for adjusting the relative displacement of said film with said interrupter adaptor to compensate for a change in volume of the material in the container due to a change in temperature relative to a predetermined reference temperature.

16. An apparatus according to claim 15, wherein a boundary is defined between said opaque portion of said substantially transparent portion of said film and wherein said boundary comprises a step-wise shaped boundary.

17. An apparatus according to claim 16, wherein said detecting means comprises a cable, wherein said cable is operatively connected to said rotating means and said piston, wherein said cable is wound and unwound about said rotating means in relation to the amount of displacement of said detecting means, wherein said rotating means comprises a first resilient tensioning means for maintaining said cable in tension, wherein said interrupter adapter comprises second resilient tensioning means and a take-up reel operatively connected to said film and said second resilient tensioning means for winding said film about said take-up reel when said film is unwound from said rotating means and for unwinding said film from said take-up reel when said film is wound about said rotating means.

* * * * *